Patented Dec. 27, 1949

2,492,505

UNITED STATES PATENT OFFICE 2,492,505

METHOD OF MAKING FRUIT JUICE CONCENTRATES

John A. Steffens, Suffern, N. Y., assignor to The Hurd Corporation, New York, N. Y., a corporation of Delaware No Drawing. Application May 5, 1945, Serial No. 592,267

3 Claims. (Cl. 99—205)

My present invention relates to improvements in solidified fruit juice concentrates and to methods of making same. More particularly it relates to the production of fruit concentrates in soft solid or paste form in which the proportions of crystallizable sugar, water and inert materials are so chosen within limits ascertained by me and hereinafter disclosed to give a plastic mass or paste characterized by high stability, ease of reconstitution and other qualities as will be hereinafter apparent.

Heretofore, in the manufacture of fruit juice concentrates, the juice has been evaporated either to yield a syrup as a final product or, in some instances, dry powder. Certain drawbacks have attended these procedures. In the case of fluid concentrates or syrups, for example, there is a tendency for them to ferment and otherwise to deteriorate upon storage; and in addition, the containers required for liquid are relatively expensive, and the comparatively large amount of water present makes the cost of shipping high. In the case of dry powder, because of the extraction of all the water, reconstitution to the original fruit juice or to one having substantially the same chemical and physical characteristics, is a matter of considerable difficulty. Furthermore, the dry solids do not keep well especially if exposed to the air; in this event the vitamin content rapidly deteriorates by oxidation; also the granular solids are found to be susceptible to the action of molds, and moreover they tend to absorb odors from the surroundings.

I have now discovered that these several disadvantages may be overcome by establishing certain definite proportions of crystalline sugar, water, and inert solids whereby a micro-crystalline supporting structure is had which enables the material to be in the form of a plastic mass, i. e., one which is moldable, does not flow, which keeps its shape but can be deformed by mechanical pressure. In general this relationship of crystalline sugar to water to inert material which has been found by me to be most advantageous may be expressed by the following equation:

$$S = I + 5W$$

i. e., the per cent. by weight of crystalline sugar, (i. e., natural and added) (S) present should equal that of the inert material, i. e., fruit acids, salts, pectins, gums and proteins and uncrystallizable sugars, plus five times the per cent. by weight of water (W) present.

In carrying out my invention which is applicable to fruit juices in general I may proceed in accordance with the following illustrative examples:

1. To 34 parts of pineapple juice concentrate having 36% solids are added 100 parts sucrose. The mixture is brought to a boil and evaporated under atmospheric pressure until the temperature reaches 115½ degrees C. (thereby indicating that the sugar content will be within the correct range), whereupon it is then dropped to a cooler which cools it to a temperature of about 80 degrees C. From there the liquid concentrate, which is now supercooled, passes to a crystallizer provided with a continuous agitator and a jacket through which water is circulated for the purpose of temperature control. Some crystallization having taken place, a portion of the material as it leaves the crystallizer is pumped back thereto to induce crystallization of the rest of the mass, the material being discharged still in a partly fluid condition. The temperature at this point should be around 50 to 60 degrees C. The still fluid material is flowed in containers and permitted to solidify. Vacuum distillation may of course be employed if desired; and the corresponding end boiling point used is selected from the tables of saccharimetry. Among the advantages of vacuum distillation is the fact that the final concentrate may be passed directly to the crystallizer without having to be cooled.

As a check as to whether or not the end boiling point is a proper one, moisture determinations may be run on the concentrate using the known toluene distillation method. In general an atmospheric boiling point range from 110–125 degrees C. may be employed.

The following example is given of a guava jelly base:

2. To 100 parts of sugar add 30 parts of water and bring to a boil. Evaporate sufficient water to raise the boiling point to 125 degrees C. and add 21 parts of concentrated guava juice of 31% solids content. Stir and evaporate to a temperature of 116 degrees C. Cool rapidly to 70 degrees C., induce crystallization by seeding, stir and cool to 50 degrees C. and run into containers. The product sets to a solid plastic mass weighing approximately 122 parts. This mass may now be melted, a solution of 1.5% citric or tartaric acid added in the proportion of 25 parts to 100 parts of the melted mass and the clear melt poured into jars where it will solidify.

My improved product in the form of a paste as above described will keep indefinitely provided only if it is protected from the atmosphere; or, if exposed to the atmosphere, the conditions of humidity are not such as to cause either excessive drying or undue condensation. My improved paste may be readily converted to liquid or semi-liquid forms merely by the addition of the appropriate amount of water. To best accomplish this, the paste is liquefied by heat and the desired amount of water and other ingredients stirred in. Examples of such products of which my improved product may constitute the base are: jelly bases, candy centers, cake icing, ice cream topping, soft drinks, etc.

The formula given of $S = I + 5W$ may be varied within certain limits depending upon the exact type of paste desired. Thus for a somewhat softer mass useful as a spread for bread the formula may read:

$$S = \frac{2I}{3} + 4W$$

For a rather hard paste the formula may be $$S = \frac{3I}{2} + 6W$$

The method above given of making a pineapple solid plastic concentrate may be used with but little change on juices of other fruits having approximately the same solids content, i. e., 14.5%, examples being apple, apricot, cherry, crabapple, plums, prunes, quince. Similarly, the method of making a guava concentrate is applicable to other fruits of approximately the same solids content, i. e., around 8%, namely, gooseberry, strawberry, grapefruit. Since in composition fruits are very much alike—all containing protein, acids, gums, invert as well as crystalline sugar, in varying amounts, the teachings of the above examples can readily be applied to fruits that have not been mentioned, including the berry fruits, tropical fruits, oranges, etc.

When starting with the juice as it is extracted from the fruit, attention should be paid to whether or not the juice was extracted hot or cold. If the extraction is hot, the amount of pectins and other inert materials present is greater than if the extraction is cold. The more pectins present, the greater the amount of crystallizable sugar that must be added, as is apparent from the formulas given; and also the less "short" the resulting paste will be. In many instances a paste in accordance with my invention may be made from cold pressed juice without having to increase the amount of crystallizable sugar over that naturally present. In so proceeding the cold pressed juice, as for example pineapple juice, is rapidly evaporated to give a syrup of the proper boiling point, i. e., in the range 110–125 degrees C., and then cooled, these operations being carried out as rapidly as possible to keep down the amount of inversion. Thereafter a paste is formed by crystallizing in the usual way. If, on the other hand, the pineapple juice is obtained by hot pressing, either sucrose or crystallizable dextrose or other crystallizable sugar must be added to bring the sugar to water to inert material to the proper values.

In general the supporting crystalline structure or matrix may be either sucrose or dextrose, or mixtures of these, depending on the nature of the juice and the amount of crystallizable sugar added. Because of the conditions under which crystallization of the sugar is had, the crystals formed are extremely fine whereby the product is without objectionable grit or graininess. The solid paste mass produced is non-porous whereby the air cannot permeate it. Thereby the vitamin content of the mass is protected. If desired some or all of the pulp of the fruit may be present. Also other solid matter such as fruit, etc., may be incorporated. Before incorporation it is desirable to first "glace" fruit pieces as by placing them in boiling supersaturated syrup until diffusion has been effected, removing the pieces, draining and incorporating into the mass before pouring. In some cases such as cocoanut, the fruit may be incorporated before the crystallization starts.

One advantage of my improved process is that it lends itself to either batch operation, as above illustrated, or to continuous operation, if desired.

While I have disclosed my invention in detail, it will be understood that various changes and modifications may be had as will occur to those skilled in the art, without departing from the spirit of my invention or the scope of the appended claims.

I claim:

1. The method of making a fruit juice concentrate in the form of a plastic mass, which comprises determining the amount of crystallizable sugar and inert materials comprising fruit acids, pectins, uncrystallized sugars and proteins in a fruit syrup, then adding crystallizable sugar thereto to bring the crystallizable sugar content in the final product to within the limits of $S = \frac{2}{3}I + 4W$ to $S = 3/2I + 6W$, where S equals crystallizable sugar, I equals inert materials, and W equals water, then boiling the mixture until the above composition is had, then cooling and causing the crystallizable sugar in said paste to crystallize.

2. The method of making a fruit juice concentrate in the form of a plastic mass, which comprises determining the amount of crystallizable sugar and inert materials comprising fruit acids, pectins, uncrystallized sugars and proteins in a fruit syrup, then adding crystallizable sugar thereto to bring the crystallizable sugar content in the final product to within the limits of $S = \frac{2}{3}I + 4W$ to $S = 3/2I + 6W$, where S equals crystallizable sugar, I equals inert materials, and W equals water, then boiling the mixture until the above composition is had, then cooling, seeding the cooled mass and causing the crystallizable sugar in the mass to crystallize.

3. The method of making a fruit juice concentrate in the form of a plastic mass, which comprises extracting the juice from fruit, concentrating the juice so obtained by rapid evaporation to give a syrup having a boiling point of 110 degrees C. or higher, adding crystalline sugar to bring the crystallizable sugar content in the final product within the limits $$S = \frac{2}{3}I + 4W \text{ to } S = 3/2I + 6W$$

where S equals crystallizable sugar, I equals inert materials comprising fruit acids, pectins, uncrystallized sugars and proteins, W equals water, then boiling the mixture until the above composition is had, at which time the boiling point at atmospheric pressure is in the range 110 to 120 degrees C., subjecting to concentrate at a temperature not substantially above 80 degrees C. to conditions promoting crystallization.

JOHN A. STEFFENS.

REFERENCES CITED

The following references are of record in the file of this patent:

UNITED STATES PATENTS

| Number | Name | Date |
|--------|------|------|
| 2,087,076 | Wadsworth et al. | July 13, 1937 |
| 2,116,920 | Wickenden | May 10, 1938 |
| 2,147,238 | Bruce | Feb. 14, 1939 |